Jan. 28, 1930.  W. F. MacGREGOR  1,744,978
COMBINATION HARVESTER THRASHER
Filed April 19, 1926    2 Sheets-Sheet 2
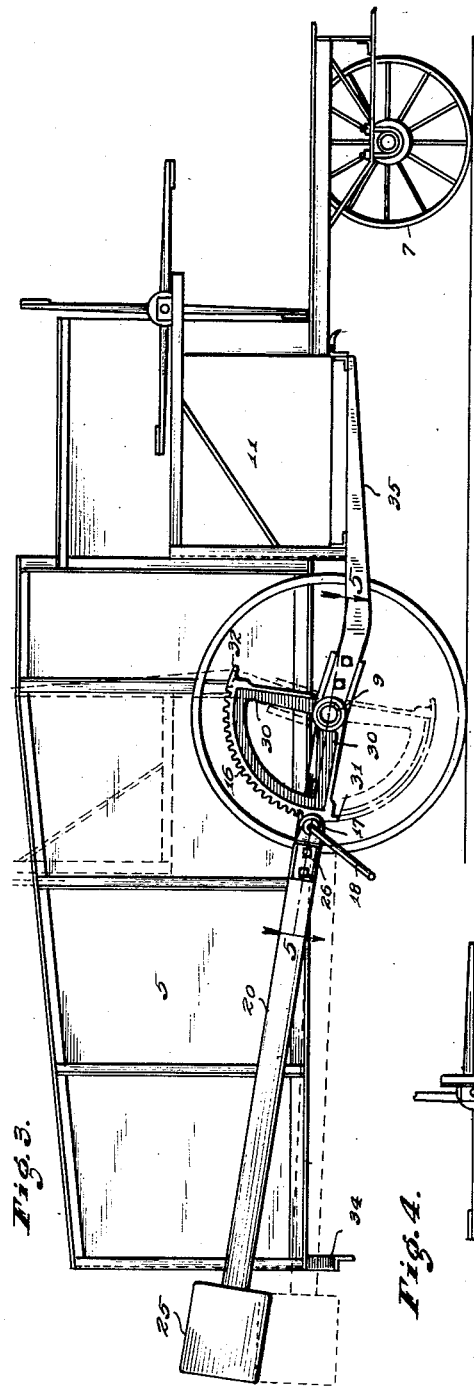
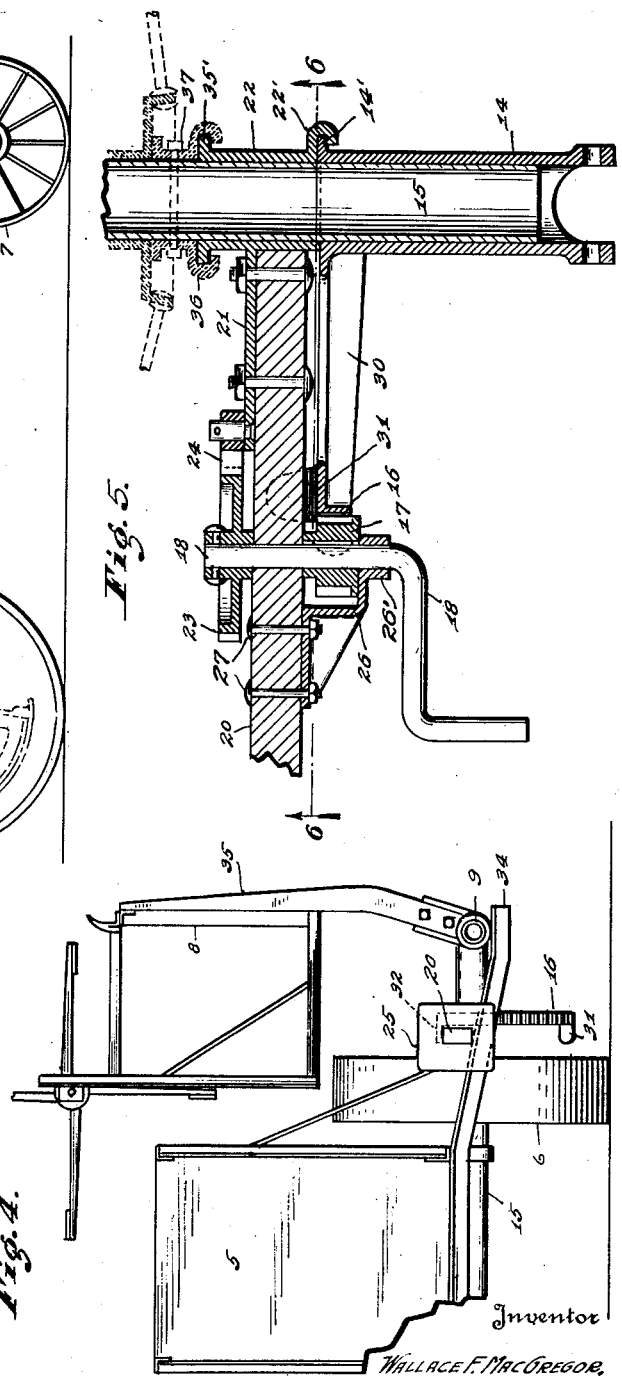
Inventor
WALLACE F. MACGREGOR,
By James A. Walsh
Attorney Patented Jan. 28, 1930

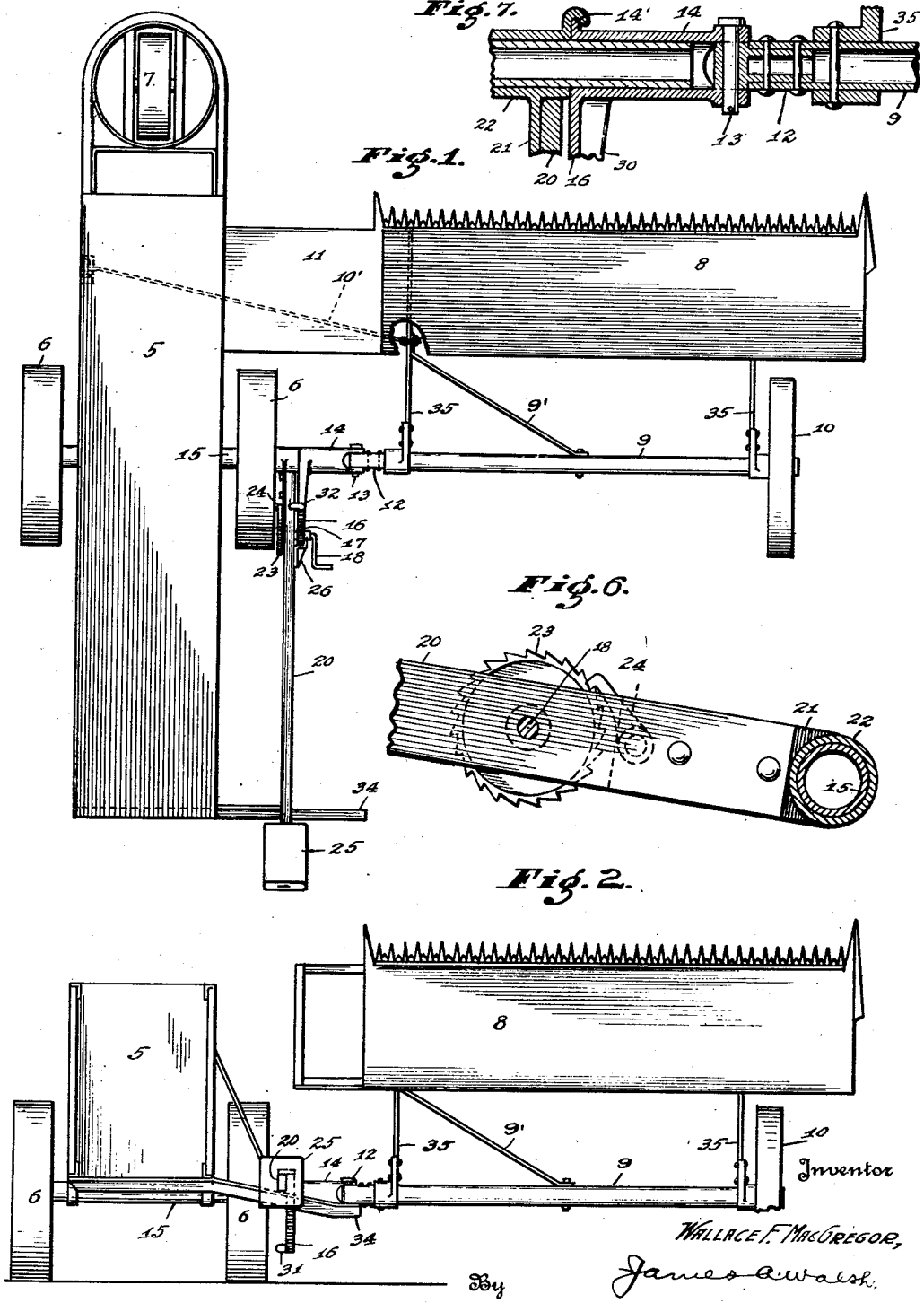

1,744,978

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

COMBINATION HARVESTER THRASHER

Application filed April 19, 1926. Serial No. 102,846.

Combination harvester-thrashers, as is well known, are considerably wider than other transportable agricultural machinery, and it is therefore desirable to assemble the thrashing and harvesting elements thereof as to permit them to readily pass through gates, over roadways, bridges, and the like, and it is the object of my invention to provide means for appreciably decreasing the width of such a combination machine for transportation and storage and to so position the harvester (or header) in relation to the thrasher as to be supported and carried thereby; and I have also provided further improvements in such a machine, as will now more fully appear.

In the accompanying drawing, forming part hereof, Figure 1 is a plan of a machine embodying my improvements and showing the harvester in normal cutting position; Fig. 2 a rear elevation showing the harvester transposed to edgewise position in relation to the thrasher; Fig. 3 a side elevation of the thrasher and indicating a portion of the harvester and associated parts in full and dotted lines when the harvester is in such edgewise position; Fig. 4 a rear elevation showing the harvester folded alongside the thrasher; Fig. 5 a detail section taken on the dotted line 5—5 in Fig. 3; Fig. 6 a detail of ratchet-and-pawl mechanism which I employ, taken on the dotted line 6—6 in Fig. 5; and Fig. 7 is a detail section of the coupling for connecting the harvester and thrasher.

In said drawings the portions marked 5 indicate a thrasher supported on carrying wheels, 6, 7, as is common, and 8 is a harvester connected to a suitable support on the thrasher, preferably an axle 9 which carries a ground-wheel 10 at its outer end, an apron 11 between the harvester and thrasher being provided, as usual. Said axle and harvester are braced by a rod 9' and the harvester and thrasher are braced by a pivotally connected draft-rod 10' which prevents the harvester from turning from its course in relation to the thrasher during field operations. Upon said axle 9 is a coupling, 12, connected by a pin, 13, to a rotatable or rocking coupling member, 14, having a flange 14', Fig. 5, mounted on the thrasher or its axle, 15. Integrally formed with or connected to said coupling 14 is a segment-rack, 16, oscillating on support 15, which rack engages a pinion, 17, mounted on crank, 18, which latter in turn passes through a counterbalancing arm, 20, connected, at 21, to a rotatable collar, 22, positioned upon a thrasher support or its axle 15, the inner end of said crank being provided with a ratchet, 23, adapted to be engaged by a pawl, 24, supported on the connection 21, and the counterbalancing arm 20 having a weight, 25, at its free end, as usual. The outer portion of crank 18, upon which pinion 17 is mounted, is supported by a bracket, 26, connected by bolts, 27, to said arm 20, the outer end of the bracket terminating in a bearing, 26', and which bracket also constitutes a guard for the pinion 17. The arms, 30, of segment-rack 16 are provided with stops, 31, 32, terminating at right angles as shown by dotted lines in Fig. 5 and adapted to engage the arm 20, for a purpose to appear. Collar 22 is provided with a keeper 22' in which flange 14' is secured, and at its opposite end said collar 22 has a flange 35' which is held in position on the support 15 by a retainer 36 secured by a bolt 37 or otherwise by which assemblage said collars are securely held in place.

In the operation of a combination harvester-thrasher embodying my improvements it will be understood that the harvester 8 is raised and lowered, that is, adjusted to the height of cut, by suitable mechanism (not shown) connected to said harvester and under control of an operator on the thrasher 5, and in order to counterbalance the offset weight of said harvester, which is secured to and extends forwardly of axle 9 or other suitable support, in any desired manner, I employ the weighted arm 20, the under side of which is engaged by stop 31 of the segment-rack. As the harvester is moved in a vertical direction said stop or shoe will function to raise the arm as the harvester is lowered, and, when the harvester is raised, said arm, resting upon stop 31, will follow the downward movement of segment-rack 16 until said arm rests upon the supporting member or arm, 34, projecting from the thrasher, so that whenever the harvester is moved while in cutting position the weighted arm will also move in the opposite direction, and thus counterbalance the weight of the harvester and relieve the labor of the operator when adjusting said harvester vertically for the purpose stated. When it is desired to move the machinery in entirety from field to field or otherwise I am enabled to compactly fold the harvester in edgewise position alongside the thrasher in the following manner. By turning crank 18 the pinion 17 will actuate segment-rack 16 in a downward direction as indicated by the dotted lines in Fig. 3, the weighted arm 20 assuming its resting position on support 34, also as indicated by dotted lines in said Fig. 3, it being understood that said weighted arm and rack are independently pivotally mounted on the support 15 of the thrasher. Continued turning of crank 18 causes the pivotally mounted coupling 14 and harvester support 9 to likewise rotate, the latter carrying with it the harvester secured thereto by arms, 35, or otherwise, so that when segment-rack 16 has been actuated to assume the position indicated by the dotted lines in Fig. 3 the harvester platform has been transposed to the vertical or edgewise position indicated by the dotted lines in Fig. 3 and full lines in Fig. 2, at which point further movement of the harvester is prevented by the stop 32 which has been brought into contact with the upper side of weighted arm 20, meantime during the oscillation of said rack the ratchet-and-pawl serving to prevent the reverse movement of the rack. When the harvester platform has been brought into edgewise position the pintle 13, which normally is in horizontal position, has been transposed into vertical position in relation to coupling members 12 and 14, and I am therefore enabled to readily swing the harvester on such axis in a horizontal direction, so that said harvester will occupy the position shown in Fig. 4 and be supported on the arm 34 in proximity to the weighted arm 20 and in which manner the thrasher and harvester elements are folded together and the width of the machine thus materially reduced for the purposes stated; and I am therefore enabled to dispense with universal joints commonly employed for connecting the harvester and thrasher elements as the single pintle 13 in normal horizontal position permits the vertical oscillation of the harvester, and when transposed to edgewise position in the manner stated the horizontal swinging of said harvester is readily accomplished. When arranging the machinery for field operations, it will be understood, of course, that the harvester is swung away from the thrasher, and turning of crank 18 is reversed, which causes the segment-rack 16 to travel in the opposite direction and at the same time lower the harvester into horizontal position ready for cutting, as indicated in full lines in Fig. 3, upon which occurrence the stop 31 again contacts with weighted arm 20 and the counterbalancing relation between said arm and harvester is restored.

I claim as my invention:

1. In a machine of the class described, a thrasher, a harvester, a coupling connecting said elements, a rack connected to said coupling, and means for actuating said rack to transpose said harvester from horizontal to edgewise position and rotating said coupling and incidentally transposing its pivotal connection from horizontal to vertical position.

2. In a machine of the class described, a thrasher, a harvester, means for connecting said elements, means for rotating said connecting means to transpose said harvester into edgewise position in relation to said thrasher, and means supported by said thrasher for counterbalancing the offset weight of said harvester when the latter is adjusted to the height of cut in field operations.

3. In a machine of the class described, a thrasher having a support extending therefrom, a harvester, flexible means connecting said harvester to said thrasher support whereby the harvester may be oscillated in vertical and horizontal directions, means associated with said connecting means for transposing said harvester from horizontal to edgewise position, and means supported by said thrasher and cooperating with said transposing means for counterbalancing the weight of said harvester.

4. In a machine of the class described, a thrasher, a harvester having a support, a hinged coupling connecting said support to said thrasher, a segment-rack connected to said coupling, a counterbalancing member mounted on said thrasher and adapted to rock, means for actuating said segment rack to rotate said harvester, and means on said rack engaging said counterbalancing member to actuate the latter upon the movement of said rack whereby said member counterbalances the weight of said harvester.

5. In a machine of the class described, a thrasher having a support, a counterbalancing mechanism rockingly mounted thereon, a harvester, means for rockingly connecting said harvester to said thrasher support, means adjacent said counterbalancing mechanism for rotating said harvester from horizontal to edgewise position, and means on said rotating means engaging said counterbalancing mechanism to balance the weight of said harvester.

6. In a machine of the class described, a thrasher, a harvester, an axle supporting said harvester and having a coupling member at its inner end, a coupling member supported on said thrasher, a pintle connecting said couplings so positioned as to permit the vertical oscillation of said harvester when in cutting position, and means for rotating said axle to transpose said harvester from horizontal to edgewise positions.

7. In a machine of the class described, a thrasher, a harvester, an axle supporting said harvester and having a coupling member at its inner end, a coupling member supported on said thrasher, a pintle connecting said couplings so positioned as to permit the vertical oscillation of said harvester when in cutting position, and means for rotating said axle to transpose said harvester into edgewise relation to said thrasher and incidentally positioning said pintle whereby the harvester may be swung to swing alongside said thrasher.

8. In a machine of the class described, a thrasher, a harvester, an axle supporting said harvester, means for rockingly connecting said axle to said thrasher, means for rotating said axle to position said harvester in edgewise relation to said thrasher, and means for preventing the reverse movement of said rotating means as said harvester is being raised.

9. In a machine of the class described, a thrasher, a harvester, an axle supporting said harvester, means for rockingly connecting said axle to said thrasher, means for rotating said axle to position said harvester in edgewise relation to said thrasher, means for preventing the reverse movement of said rotating means as said harvester is being raised, and counterbalancing mechanism supported by said thrasher and cooperating with said rotating means to balance said harvester when adjusted to cutting positions.

10. In a machine of the class described, a thrasher, a harvester, a support for said harvester, a coupling connecting said harvester support to said thrasher, mechanism connected to said coupling for manually rotating the latter to transpose said harvester from horizontal to edgewise position, and means for counterbalancing the weight of said harvester while the latter is being adjusted to the height of cut.

11. In a machine of the class described, a thrasher having a support, counterbalancing mechanism rotatably mounted on said support, a coupling member rotatably mounted on said support, an axle connected to said coupling, a harvester supported on said axle, and rack-and-pinion mechanism connected to said coupling member for rotating said harvester into edgewise and horizontal positions in relation to said thrasher.

12. In a machine of the class described, a thrasher, a harvester, a support on which said harvester is mounted, flexible means for connecting said support to said thrasher, a rack mounted on said flexible means, a counterbalancing arm supported on said thrasher, and means associated with said rack and said counterbalancing arm for operating said rack to rotate said flexible means to transpose said harvester from horizontal to edgewise position in relation to said thrasher.

13. In a machine of the class described, a harvester having an axle, a coupling on said axle, a thrasher having a support, a coupling on said support, a pintle connecting said couplings and normally positioned horizontally therebetween, means for turning said couplings and transposing said harvester into edgewise position and incidentally said pintle into vertical position whereby the harvester may be folded in edgewise position alongside said thrasher.

14. In a machine of the class described, a thrasher having a support, a counterbalancing arm rotatably mounted on said support, a rack rotatably mounted on said support, a supporting arm on said thrasher, means on said rack engaging said counterbalancing arm, and means for actuating said rack to position said counterbalancing arm upon said supporting arm.

15. In a machine of the class described, a thrasher, a harvester, counterbalancing mechanism supported on said thrasher, a rack pivotally mounted on said thrasher support, a harvester support flexibly connected to said thrasher support, a harvester mounted on said harvester support, means for actuating said rack for rotating said harvester and actuating said counterbalancing mechanism, and means on said thrasher for limiting the movement of said counterbalancing mechanism and disengagement of said rack from said mechanism to permit the continued rotation of said harvester to transpose the latter in edgewise relation to said thrasher.

In testimony whereof I affix my signature.

WALLACE F. MacGREGOR.